United States Patent [19]

Keller

[11] Patent Number: 4,693,575
[45] Date of Patent: Sep. 15, 1987

[54] CAMERA SUPPORT

[76] Inventor: James H. Keller, 254 Knoll Dr., Park Ridge, N.J. 07656

[21] Appl. No.: 855,175

[22] Filed: Apr. 22, 1986

[51] Int. Cl.⁴ ............................................. G03B 17/56
[52] U.S. Cl. ....................................... 354/82; 354/293
[58] Field of Search ................... 354/82, 293; 352/243

[56] References Cited

U.S. PATENT DOCUMENTS

| 2,780,156 | 2/1957 | Thevenaz | 354/293 |
| 3,731,897 | 5/1973 | Price | 354/293 |
| 3,966,101 | 6/1976 | Taylor | 354/82 |
| 4,104,623 | 8/1978 | Sloop | 354/82 |
| 4,198,150 | 4/1980 | Sloop | 354/82 |

Primary Examiner—A. A. Mathews
Attorney, Agent, or Firm—Stefan J. Klauber

[57] ABSTRACT

A camera support or holder for a hand-held camera has an arcuate member for reception in the user's palm, and a camera-engaging assembly secured to it for adjustable connection to the camera, at the conventional or standard threaded recess in the camera normally used for attaching a tripod to the camera.

7 Claims, 5 Drawing Figures

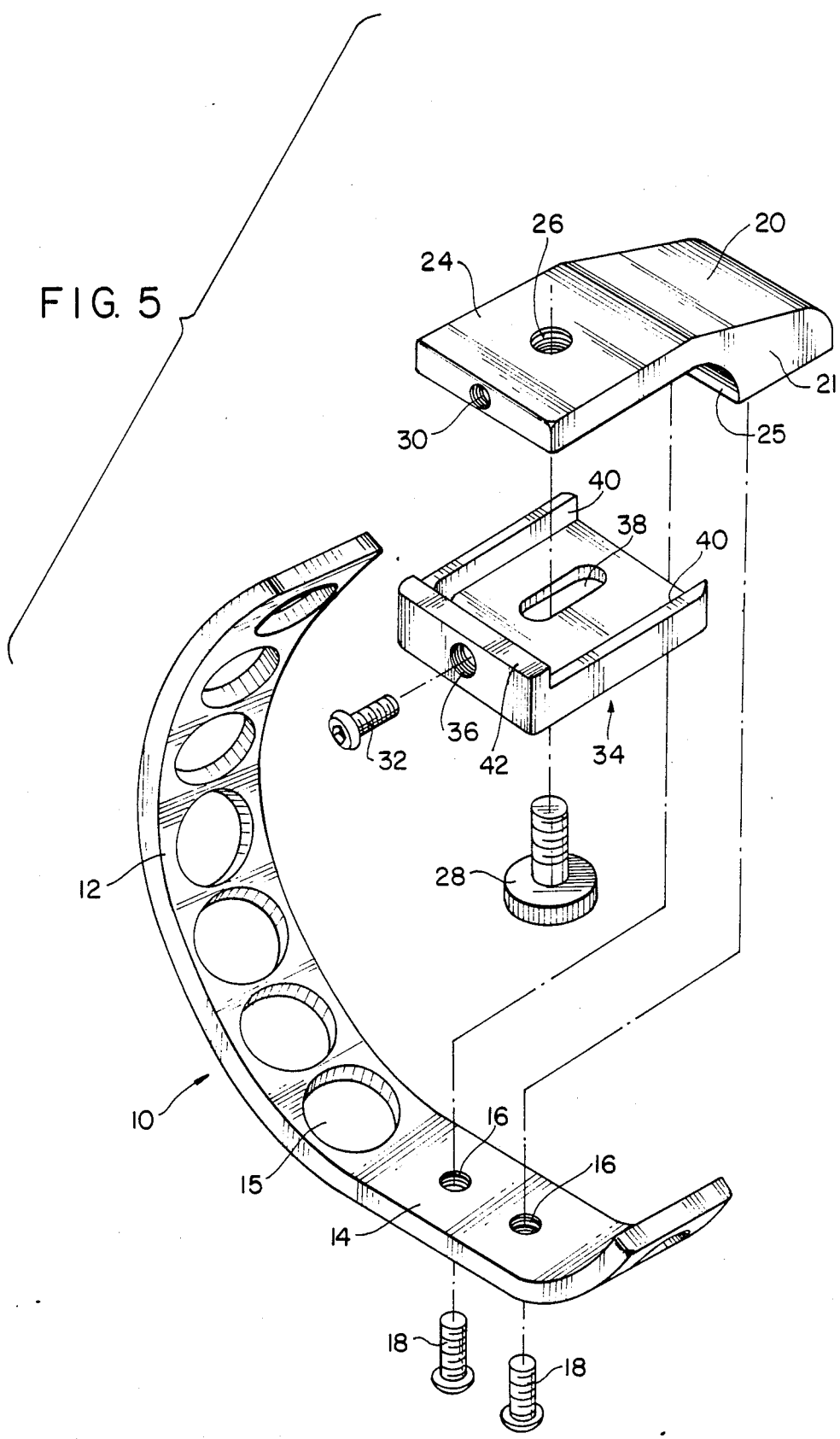

CAMERA SUPPORT

FIELD OF THE INVENTION

This invention relates to a means for supporting a camera, and is more particularly concerned with a means for supporting a camera intended to be handheld, such as a conventional 35mm camera.

BACKGROUND OF THE INVENTION

During the normal use of a hand-held camera, the hand of the user which supports the camera is generally fully occupied in maintaining the camera in the desired position; therefore the fingers of that hand are not freely available for manipulating the lens of the camera. Thus, the other hand is the only one which can be used to adjust the camera lens. Except in the case of the most elementary type of camera, the inability to support the camera and manipulate the lens with the same hand is a serious drawback, especially when the camera is equipped with a special lens, such as a telephoto or a "zoom" lens, which needs to be manipulated simultaneously with the other camera operations. Furthermore, the added weight of a special lens presents a serious impediment to holding the camera steady during the manipulation of such a lens, and during the picture taking action.

The most common apparatus for holding a normally hand-held camera steady, and freeing the hands of the photographer, is a tripod extending from the camera to the ground. However, it is often not convenient, and is indeed a serious burden to use a tripod, since tripods are often heavy and unweildey, and in any event are inconvenient to carry. Furthermore, a proper ground support surface for the tripod may not be available at the locale at which it is desired to use the camera. Realizing these problems, prior art workers have devised and proposed various types of non-tripod camera supports and holders to steady the camera. However, these devices do not allow the simultaneous manipulation of the camera lens, and are often extremely cumbersome.

A typical prior art camera support of the non-tripod type is described in Taylor, U.S. Pat. No. 3,966,101, which discloses a device to which the camera can be secured, and which is intended to be strapped to the forearm of the user.

While previously-proposed devices are effective for their intended purposes, they tend to be complicated in structure, bulky, and generally inconvenient for the photographer, who is in need of an aid of this type to allow the use of both hands to steady the camera while still being able to operate and manipulate the lens.

It is, accordingly, an object of the present invention, to provide a means of support for a camera of the handheld type, which avoids the drawbacks and disadvantages of prior constructions.

It is a further object of the invention to provide a camera support or holder of the character indicated, which is easy to use, is non-complicated in construction, and is readily transportable.

It is a still further object of the present invention, to provide a camera support or holder of the aforementioned character, which enables the user of same to readily and comfortably support a 35mm camera or the like which is equipped with a telephoto or similar zoom lens, while at the same time facilitating the user's simultaneous manipulation of the lens focusing/zoom rings, to thereby serve the dual function of support of camera and assistance in the manipulation of the camera lens.

A further object of the invention is to provide a camera reference point for the hand which is used to manipulate the lens, such that the fingers of the hand can readily locate the zoom and focus rings of the lens without the camera user having to physically look at the lens.

A still further object of the invention, is to provide a camera support of the aforementioned character which is of light weight and sturdy construction, and which does not substantially add to the size of the camera, so as to facilitate and promote its use by the camera operator.

Yet a still further object of the invention is to provide a camera support or holder of the aforementioned character, which in addition to serving the support and lens manipulation functions aforementioned, serves to provide an additional grasping means enabling safe handling and manipulation of the camera when same is removed from the camera case in its most commonly used configuration.

BRIEF DESCRIPTION OF THE INVENTION

In accordance with the invention, there is provided a camera support or holder for a hand-held camera, which comprises an arcuate member intended to be held in the palm of the camera lens manipulating hand, usually the left hand; and a camera-engaging assembly secured to it for connection to the camera, the engaging assembly being constructed for attachment to the camera by means of the standard threaded recess in the camera otherwise intended for attachment of a tripod.

The device of the invention, which can be conveniently referred to as a "palm ring", is of light weight and sturdy construction, is convenient to carry, e.g. in a pocket or the like, and is easy and appealing to use. It is of a non-complicated construction, and a particular feature of the device of the invention is that it permits the user to easily support the camera in the palm of his hand while yet leaving the fingers of the supporting hand free to manipulate the camera lens, e.g. the focus and "zoom" rings associated with the camera lens, while the other hand is free in the usual manner to actuate the shutter mechanism and also to help support the camera.

The arcuate member typically encompasses approximately a semi-circle, and when secured at the tripod receiving port of the camera, extends about the bottom facing portion of the telephoto or similar lens, but in spaced relationship therefrom, whereby the user of the camera may support same in the palm via the ring, the spacing between ring and lens being appropriate to simultaneously enable the fingers of the user to manipulate the focusing/zoom rings of the lens. The approximately semi-circular configuration also facilitates the user supporting the camera in either the "horizontal" or "vertical" picture-taking orientations.

BRIEF DESCRIPTION OF THE DRAWING

The foregoing and other objects and features of the invention will be readily apparent from the following detailed description of illustrative embodiments of the invention, taken in connection with the accompanying drawings, wherein.

FIGURE 5 is an exploded view of the holder or support embodiment of the invention shown in FIGS. 1-4, illustrating the relationship of the various component parts.

DESCRIPTION OF THE PREFERRED EMBODIMENT

Figure 1:
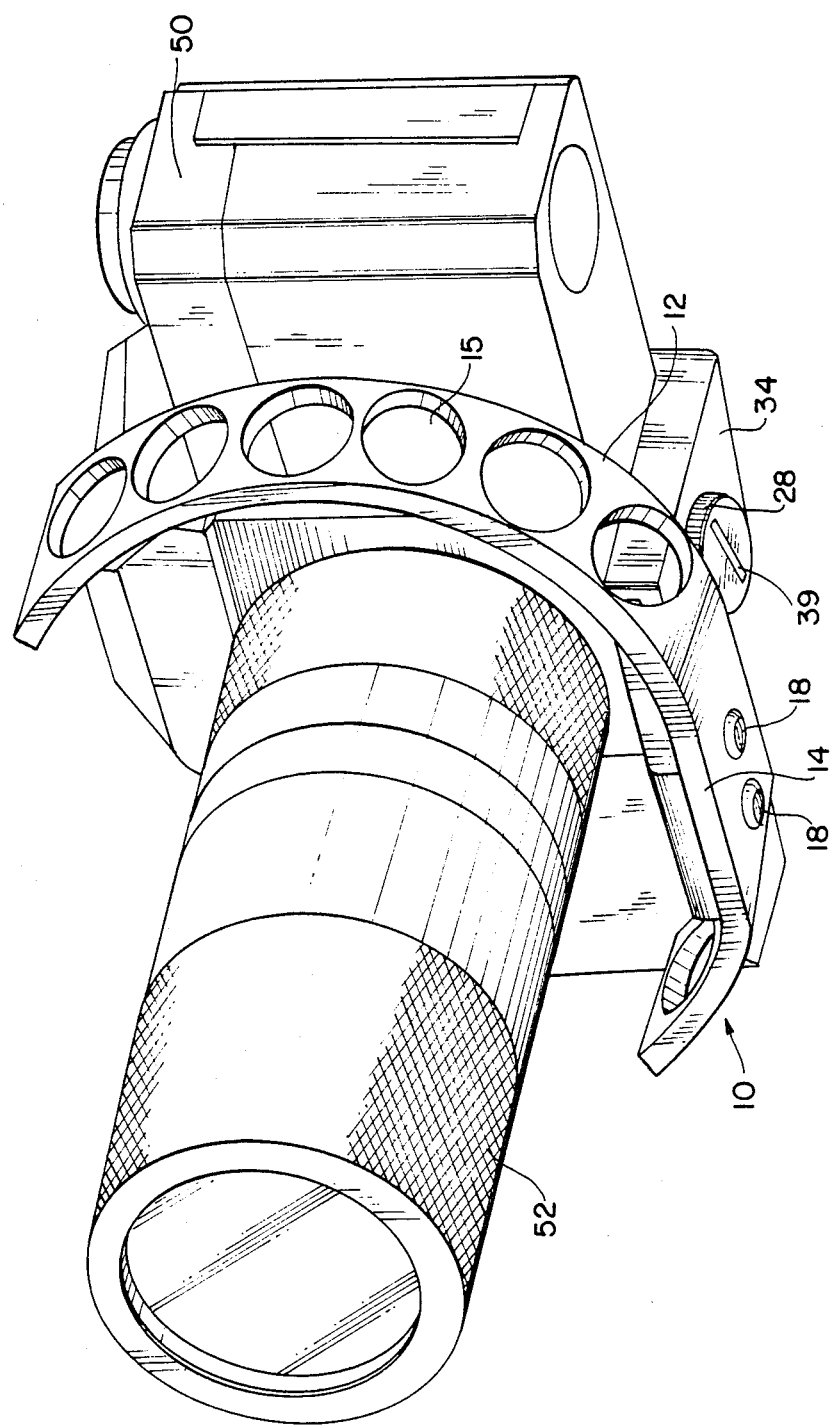
FIG. 1 is a perspective view of an embodiment of the camera holder or support of the invention, showing it attached to a typical 35mm camera (provided with zoom or telephoto or telephoto/zoom lens) as seen from the lower front.

Referring now to the drawings, and particularly to FIGS. 1 and 5, the device of the invention, indicated generally by the reference numeral 10, has a body 12 which is generally arcuate in shape and conveniently extends for about 180° of arc, with a flattened portion 14 near one end. Flat portion 14 has screw holes 16 for reception of screws 18 for securing body 12 to a bracket 20 which has a body 21 formed with threaded apertures (not shown) for threaded engagement with screws 18. In the embodiment illustrated, two screw holes 16 and screws 18 are shown, which represent a practical minimum, but a greater number may be provided, if desired. The support of the invention is conveniently formed from metal or plastic, e.g. aluminum, plastic or other substance having rigidity; but in order to reduce its weight as much as possible, (and for other purposes as will be discussed), the body 12 is suitably perforated. As shown, the perforations or openings 15 are circular in cross-section, but they may be of square, rectangular or other geometric cross-section, and their form is immaterial so long as the metal or other material remaining has sufficient strength and rigidity for the intended use, i.e. to support a camera.

In connection with the attachment of the device to a camera, the bracket 20 is formed with an extension or wing 24 which is integral with bracket body 21 and merges with it along a curved surface 25. The wing 24 has a hole 26 approximately at its center through which may be passed a thumb screw 28, as will be later described, and in its end the wing 24 is provided with a threaded recess 30 for threaded engagement of a screw 32. Cooperating with bracket 20 is an adjustable member 34 having a hole 36 in its end for the passage of screw 32 for securing it to bracket wing or extension 24 and an elongated aperture or slot 38 for the passage of thumb screw 28. Thumb screw 28 may be provided with a slot 39 in its head so that it may be tightened with a coin or the like, if desired. Member 34 has side flanges 40 positioned to overlie the sides of bracket extension 24 when the two are joined, and member 34 has an end flange 42 of greater height for cooperation with the camera with which the device 10 is used.

Figure 2:
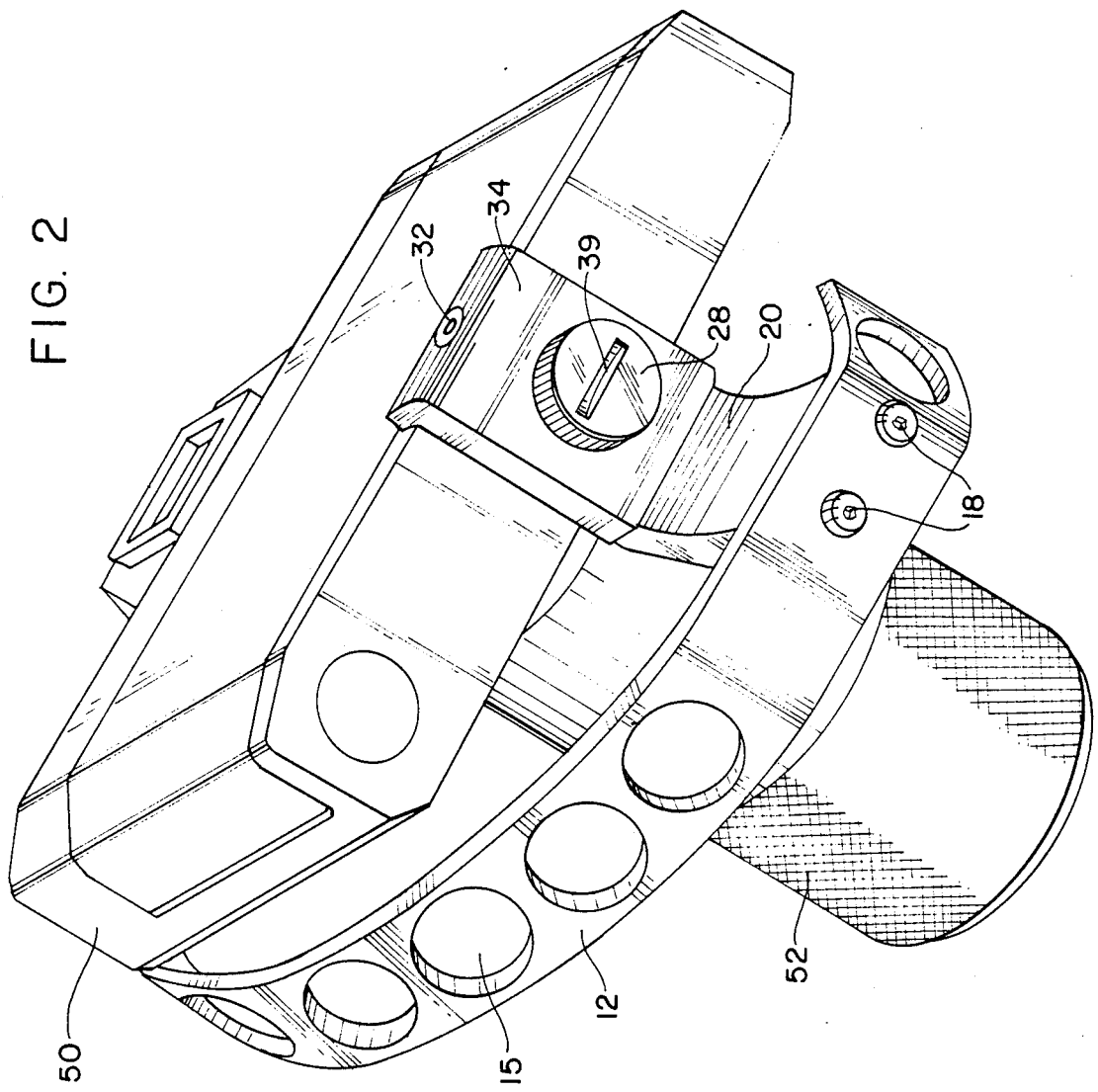
FIG. 2 is a further perspective view similar to FIG. 1, but showing the attached holder or support as seen from the bottom of the camera.
Figure 3:
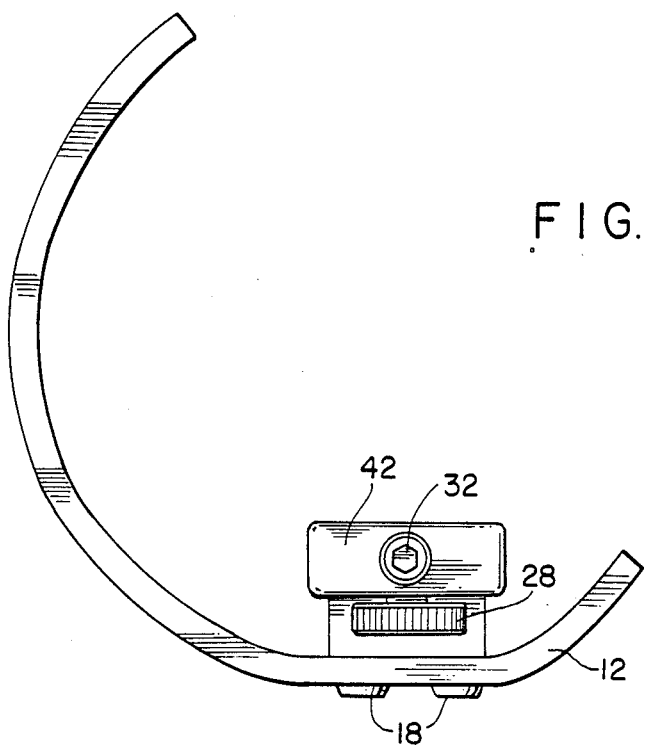
FIG. 3 is a side elevation of the holder or support embodiment seen in FIGS. 1 and 2, but shown independently of the camera.
Figure 4:
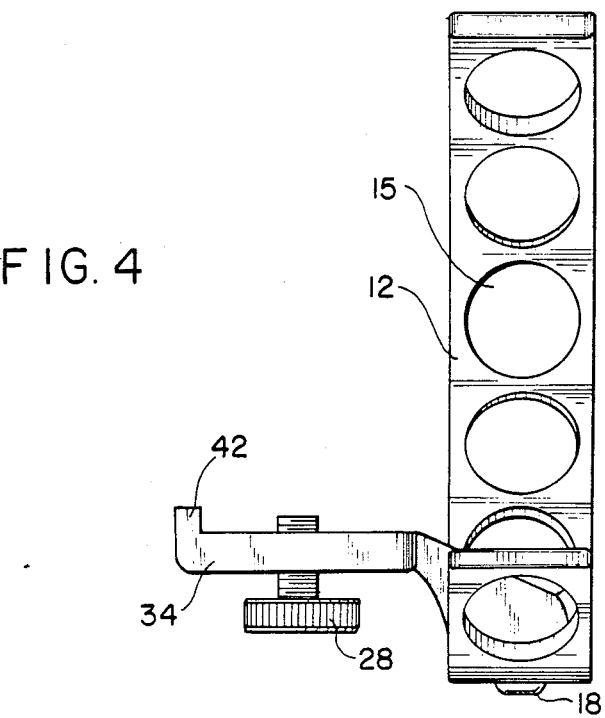
FIG. 4 is an end view of the embodiment shown in FIG. 3.

When the support or holder 10 of the invention is to be attached to a camera, e.g. the camera 50 shown in FIGS. 1 and 2, the bracket 20 being firmly secured to arcuate body 12 by means of screws 18, and adjustable member 34 being loosely attached to bracket 20 by the loose engagement of screw 32 in recess 30, the thumb screw 28 is passed through slot 38 and hole 26 and is engaged with the (not shown) standard tripod mount in camera 50 i.e. the threaded recess in the camera into which the end of a tripod is normally screwed, the screw 28, of course, being of the appropriate standard size. The screw 32 is then tightened appropriately so that end flange 42 firmly engages the lower back of the camera, all as seen in FIGS. 1 and 2. The device or "palm ring" 10 is now secured to the camera by tightening screw 28 and is ready for use.

To use the "palm ring" of the invention, it is merely necessary to hold it in the left palm and support the weight of the camera with the left hand. The other hand, e.g. the right hand, is completely free to support and actuate the camera in the usual manner while the fingers of the supporting hand, e.g. the left hand, are free to manipulate the lens of the camera, e.g. the focusing rings of the lens 52, or otherwise to assist in the steadying of the camera.

A further advantage of the particular construction shown is yielded by virtue of the openings or perforations 15, i.e. typically of circular form as shown. During use, the operator of the camera finds that the fingers are readily and very naturally received within one or more of these openings to provide a most convenient and comfortable resting place for the fingers which further aid in supporting the camera. These openings further, are found by the camera operator to serve after minimal use of the ring, as a natural and quickly learned reference point for the hand. In other words, the operator quickly gains experience from which it is evident from the openings exactly where the hand is positioned with respect to the focusing/zoom rings of the lens 52. These openings thus become bench marks or indicia of hand position after a very minimal use of the subject device.

In addition to the foregoing, the operator of the camera finds after very minimal use of the subject device, that the ring 10 quickly becomes an additional holding or securing device for carrying the camera at one's side or at other position in between picture taking. This use is particularly facilitated by the aforementioned openings 15, which enable a very sure grip of the camera as it is carried between uses.

There is thus provided a light-weight, readily portable means of support for a camera which allows both hands working in conjunction to support the camera while maintaining the ability to perform all camera functions, i.e. manipulate the lens and camera shutter, thus enabling efficient use of a camera and facilitating a broad range of photography without the need to transport and use a bulky, inconvenient and relatively-heavy tripod or other device.

Obviously, various changes and modifications may be made in the embodiment illustrated without departing from the scope of the invention as defined in the appended claims. Thus, for example, while the invention has been particularly illustrated for use with a camera of the 35mm type, it is applicable as well to other types of hand-held cameras, both still and of the movie film or video tape types. Similarly, while a transversely flattened member is preferred, the arcuate member may usefully employ other cross-sections, including e.g. other rectangular cross-sections, as well as round, elliptical, and other geometrical sections. Also, it will be understood, that as used herein, the term "arcuate" or "generally arcuate" is intended to encompass members which overall approximate an arc in form even though portions of the member may not include curvature. Accordingly, all matter contained in the foregoing description and in the drawings shall be interpreted as illustrative only, and not as limitative of the invention otherwise disclosed and claimed herein.

I claim:

1. A portable camera support comprising, in combination: a generally arcuate member shaped to extend below and along at least one side of the lens barrel of the camera and having a portion for reception by the palm of a user, an adjustable assembly comprising a bracket secured to the arcuate member; and an adjustable clamp for connection to said bracket and for engagement with the camera; and means for securing said bracket to said camera; and wherein the spacing between said member and lens barrel is sufficiently small as th allow the fingers of a user of said support to manipulate the lens barrel while the the palm of the hand rests on any externally facing portion of the arcuate member.

2. A portable camera support as defined in claim 1, wherein said arcuate member is of a width and shape to be grapsed and held by the palm of a user.

3. A portable camera support as defined in claim 1, wherein said clamp is adjustably related to said bracket to allow use on a variety of cameras.

4. For use with a hand-held camera of the type which includes a threaded tripod receiving port at the bottom of same, and a forwardly extending telephoto or zoom lens having substantial length in relation to the camera body; said support comprising in combination:

a generally arcuate member extending in an arc generally concentric with the lens barrel, said arc underlying said lens barrel and extending along at least a side of said lens barrel and being receivable in the palm of a user; and means to secure said arcuate member at the tripod receiving port at the bottom of said camera, with said arcuate member extending about the bottom facing part of said telephoto lens but in spaced relationship therefrom; whereby the user may during use of said camera, support same in the palm via resting of said arcuate member on said palm; and with the said spacing between all portions of said arcuate member and lens being appropriate to simultaneously enable the fingers of the user to manipulate operation of the said lens.

5. A device in accordance with claim 4, wherein said means for securing said member to said camera comprises a bracket extending from said member toward the body of said camera, and an adjustable clamp for connection to said bracket, for engagement with the camera; and means for securing said bracket to the threaded tripod receiving port of said camera.

6. A portable camera support comprising, in combination: a generally arcuate member having a portion for reception by the palm of a user, an adjustable assembly comprising a bracket secured to the arcuate member; and an adjustable clamp for connection to said bracket and for engagement with the camera; and means for securing said bracket to said camera, said arcuate member being provided with perforate openings to reduce its weight and provide finger holds.

7. For use with a hand-held camera of the type which includes a threaded tripod receiving port at the bottom of same, and a forwardly extending telephoto or zoom lens having substantial length in relation to the camera body; said support comprising in combination:

a generally arcuate member encompassing approximately a semi-circle and being receivable in the palm of a user; and means to secure said arcuate member at the tripod receiving port at the bottom of said camera, with said arcuate member extending about the bottom facing part of said telephoto lens but in spaced relationship therefrom; whereby the user may during use of said camera, support same in the palm via resting of said arcuate member on said palm; and with the said spacing between said arcuate member and lens being appropriate to simultaneously enable the fingers of the user to manipulate operation of the said lens, said arcuate member being generally tranversely flattened and including along its length a plurality of finger size openings to reduce the weight of said member while permitting the fingers of the operator to intermesh with said openings to provide bench mark indicia as to the lens manipulating means positions, and to provide comfortable resting places for the fingers.

* * * * *